US012717126B2

(12) United States Patent
Grasser et al.

(10) Patent No.: US 12,717,126 B2
(45) Date of Patent: Aug. 25, 2026

(54) OBSERVATION SYSTEM AND METHOD

(71) Applicant: BERTIN TECHNOLOGIES, Montigny le Bretonneux (FR)

(72) Inventors: Régis Grasser, Aix en Provence (FR); Emmanuel Soulié, Rousset (FR); Vincent Lapere, Marseilles (FR)

(73) Assignee: BERTIN TECHNOLOGIES, Montigny le Bretonneux (FR)

( * ) Notice: Subject to any disclaimer, the term of this patent is extended or adjusted under 35 U.S.C. 154(b) by 390 days.

(21) Appl. No.: 18/260,738

(22) PCT Filed: Feb. 9, 2022

(86) PCT No.: PCT/EP2022/053132
§ 371 (c)(1),
(2) Date: Jul. 7, 2023

(87) PCT Pub. No.: WO2022/171673
PCT Pub. Date: Aug. 18, 2022

(65) Prior Publication Data

US 2024/0061232 A1 Feb. 22, 2024

(30) Foreign Application Priority Data

Feb. 10, 2021 (FR) ........................................ 2101275

(51) Int. Cl.
*G02B 23/00* (2006.01)
*G02B 23/12* (2006.01)
(Continued)

(52) U.S. Cl.
CPC ............. *G02B 23/12* (2013.01); *G02B 23/16* (2013.01); *G02B 27/10* (2013.01); *G02B 27/106* (2013.01); *H04N 23/11* (2023.01)

(58) Field of Classification Search
CPC ........ G02B 23/00; G02B 23/02; G02B 23/04; G02B 23/08; G02B 23/10; G02B 23/12;
(Continued)

(56) References Cited

U.S. PATENT DOCUMENTS 656,029 A 8/1900 Leto
5,254,852 A 10/1993 Filipovich et al.
(Continued)

FOREIGN PATENT DOCUMENTS

CN 109974857 A 7/2019
EP 1857854 A1 11/2007
(Continued)

OTHER PUBLICATIONS

International Search Report issued in corresponding International Application No. PCT/EP2022/053132, dated Apr. 11, 2022, pp. 1-2, Rijswijk, Netherlands.

*Primary Examiner* — Thong Q Nguyen
(74) *Attorney, Agent, or Firm* — HAUPTMAN HAM, LLP

(57) ABSTRACT

Disclosed is an observation system including a first optical path capable of receiving first optical radiation emitted by a scene and including a first sensor configured to generate a first digital image from the first optical radiation; a second optical path capable of receiving second optical radiation and including a second sensor configured to generate a second digital image from the second optical radiation; a display configured to display a third digital image from the first and second digital images; a third optical path coupled to the display; and a fourth optical path connecting the first and third optical paths, the first optical path including an optical element configured to transmit a part of the first optical radiation to the fourth optical path.

16 Claims, 5 Drawing Sheets

(51) Int. Cl.

| | |
|---|---|
| ***G02B 23/16*** | (2006.01) |
| ***G02B 27/10*** | (2006.01) |
| *H04N 23/11* | (2023.01) |

(58) Field of Classification Search

CPC ........ G02B 23/14; G02B 23/16; G02B 23/18; G02B 23/24; G02B 23/2407; G02B 23/2415; G02B 23/2484; G02B 27/00; G02B 27/01; G02B 27/0101; G02B 27/0132; G02B 27/0134; G02B 27/0138; G02B 27/014; G02B 27/0141; G02B 27/0163; G02B 27/017; G02B 27/0172; G02B 27/0189; G02B 27/02; G02B 27/022; G02B 27/026; G02B 27/09; G02B 27/0905; G02B 27/10; G02B 27/1006; G02B 27/1013; G02B 27/106; G02B 27/126

USPC .................................. 359/399–430, 618–640

See application file for complete search history.

(56) References Cited

U.S. PATENT DOCUMENTS

| | | | | |
|---|---|---|---|---|
| 6,195,206 | B1 | 2/2001 | Yona et al. | |
| 7,307,793 | B2 | 12/2007 | Ottney et al. | |
| 7,345,277 | B2 | 3/2008 | Zhang | |
| 7,813,037 | B2 * | 10/2010 | Zadravec | G02B 23/12 359/399 |
| 8,836,793 | B1 | 9/2014 | Kriesel et al. | |
| 8,860,831 | B1 | 10/2014 | Burton et al. | |
| 9,167,179 | B2 | 10/2015 | Linsacum et al. | |
| 9,723,227 | B2 | 8/2017 | Hogasten et al. | |
| 2007/0228259 | A1 * | 10/2007 | Hohenberger | H01J 31/50 250/214 LA |
| 2019/0079169 | A1 | 3/2019 | Chiquet et al. | |
| 2024/0248320 | A1 * | 7/2024 | Grasser | G02B 27/144 |

FOREIGN PATENT DOCUMENTS

| | | | |
|---|---|---|---|
| EP | 2138885 | A1 | 12/2009 |
| FR | 3 048 800 | * | 10/2016 |
| FR | 3048800 | A1 | 9/2017 |
| WO | 03104877 | A1 | 12/2003 |
| WO | 2005069056 | A2 | 7/2005 |
| WO | 2007044582 | A1 | 4/2007 |
| WO | 2012016794 | A1 | 2/2012 |
| WO | 2012018812 | A2 | 2/2012 |
| WO | 2018215066 | A1 | 11/2018 |

* cited by examiner

OBSERVATION SYSTEM AND METHOD

The present application is a U.S. National Phase of International Application Number PCT/EP2022/053132, filed Feb. 9, 2022, which claims priority to French Application No. 2101275, filed Feb. 10, 2021.

TECHNICAL FIELD OF THE INVENTION

The invention relates to the observation of a scene, and more particularly observation using a portable system.

PRIOR ART

Monocular systems, or binoculars, are currently used to observe scenes. These systems can be purely optical, i.e. they comprise direct observation paths, for example binoculars for the magnified observation of a distant scene. Other systems, for example digital cameras, comprise both a direct observation path and a digital observation path, i.e. one that uses a digital sensor to generate a digital image of the scene being observed. However, these systems do not allow for effective observation of a scene at night.

Some systems allow a scene to be viewed at night, such as those of the patent documents CN109974857 A, WO2018215066 A1, U.S. Pat. Nos. 9,723,227B2, 9,167,179B2 and 5,254,852 A, which disclose systems having a digital observation path provided with an infrared-type sensor; and the European patent application EP1857854 A1, which discloses a system provided with two independent infrared-type cameras.

Other systems can be adapted to observe a scene both during the day and at night. For example, international patent application WO201218812 can be cited, which discloses an observation system comprising a direct observation path, a digital observation path using an infrared-type sensor and optically fusing the two paths. However, these systems are not effective enough for observation at night.

The following patent documents can be cited: WO201216794 A1, WO200744582 A1, U.S. Pat. No. 7,307,793 B2, WO200569056 A2, WO2003104877 A1 and U.S. Pat. No. 6,195,206, which disclose observation systems having a digital observation path provided with an infrared-type sensor, and a digital observation path provided with a light-intensity amplification device, and which involve the optical fusion of the two paths.

Moreover, reference can be made to the U.S. Pat. No. 8,836,793 B1, which discloses a system having two digital observation paths, each provided with an infrared-type sensor, and which involves digitally fusing the images from the sensors, and the following other patent documents: U.S. Pat. No. 6,560,029 B1, U.S. Pat. No. 7,345,277 B2, which disclose observation systems having a digital observation path provided with an infrared-type sensor, and a digital observation path having a light-intensity amplification device, and which involve digitally fusing the images from the sensor and the amplification device.

However, these systems consume a high amount of energy and must also be fitted with sufficiently large batteries, which make the systems more cumbersome.

SUMMARY OF THE INVENTION

One aim of the invention is to overcome these drawbacks, and more particularly to provide observation means that are adapted for day and night vision, and for which the power consumption of the electronic devices therein is reduced.

Another aim is to provide lightweight, portable observation means.

Yet another aim is to improve the observation of a scene both during the day and at night.

Another aim is to provide an observation system that is adapted for illuminating the scene to be observed while being sufficiently compact.

According to one aspect, the invention proposes an observation system comprising a first optical path that is capable of receiving first optical radiation emitted by a scene to be observed and including a first sensor configured to generate a first digital image from the first optical radiation; a second optical path that is capable of receiving second optical radiation emitted by the scene and including a second sensor configured to generate a second digital image from the second optical radiation; a display configured to display a third digital image from the first and second digital images; and a third optical path coupled to the display and designed to observe the third digital image.

The system comprises a fourth optical path connecting the first and third optical paths, and the first optical path includes an optical element configured to transmit a part of the first optical radiation to the fourth optical path.

The fourth optical path allows for direct observation of the scene and is also referred to as the direct observation path. The invention thus provides an observation system that limits the consumption of the sensors, since it is adapted for use during the day in the absence of a battery. According to one embodiment, the system comprises an optical assembly including the optical element and an optical system configured to transmit the part of the first optical radiation from the fourth optical path to the third optical path.

According to another embodiment, the system comprises an optical assembly including the optical element and an optical system configured to transmit the first optical radiation to the optical element.

The optical assembly can be made in one piece.

This provides a particularly simple and rigid structure.

The first sensor and the display can be fixedly mounted on the optical assembly.

Collimation between the direct observation path and a digital observation path provided with a sensor can thus be guaranteed, in order to present images to the operator with a limited offset between the fields.

The fourth optical path can comprise a crosshair reticle fixedly mounted on the optical assembly.

The system can comprise an image processing unit configured to generate the third digital image from a fusion of the first and second digital images.

The fourth optical path can include an optical attenuator having a variable opacity and capable of modifying a light intensity of the part of the first optical radiation, the image processing unit being further configured to determine a light intensity of at least one pixel of at least one of the first and second digital images, the system comprising an electronic control unit configured to output a command to vary the opacity of the optical attenuator based on the determined light intensity.

Thus, a system is provided that improves the observation of a scene. In particular, an automated system is provided that takes into account the light intensity of the optical radiation emitted by the scene to improve observation.

The electronic control unit can be configured to output a command to increase the opacity of the optical attenuator when the light intensity of said at least one pixel is greater than or equal to a threshold.

The optical element can further be configured to transmit a further part of the first optical radiation to the first sensor.

The system can further include an emitter configured to emit third optical radiation in the infrared range, the optical element being further configured to transmit the third optical radiation to the scene to be observed.

A compact observation system is thus provided and can be used to illuminate a scene to be observed.

The third optical radiation can be of the pulsed type, with the system further comprising a receiver configured to receive a part of the third pulsed optical radiation returned by the scene to be observed and an electronic control unit configured to determine a distance to the scene to be observed based on the returned part of the third pulsed optical radiation.

A compact observation system is thus provided and can be used to illuminate a scene to be observed as well as to measure a distance between the scene and the observation system.

According to another aspect, the invention proposes an observation method, comprising receiving first optical radiation emitted by a scene to be observed from a first optical path provided with a first sensor generating a first digital image from the first optical radiation; receiving second optical radiation emitted by the scene from a second optical path provided with a second sensor generating a second digital image from the second optical radiation; and observing a third digital image from a third optical path provided with a display displaying the third digital image from the first and second digital images.

The method includes transmitting a part of the first optical radiation to the third optical path.

The method can include an optical attenuator having a variable opacity and capable of modifying a light intensity of the part of the first optical radiation, and determining a light intensity of at least one pixel of at least one of the first and second digital images, and varying the opacity of the optical attenuator based on the determined light intensity.

The method can further comprise emitting third optical radiation in the infrared range and transmitting, from the first optical path, the third optical radiation to the scene to be observed.

BRIEF DESCRIPTION OF THE FIGURE

Other features and advantages will be better understood after reading the following description of specific embodiments and implementations of the invention, which are given as non-limiting examples only, with reference to the accompanying figures in which.

Figure 1:
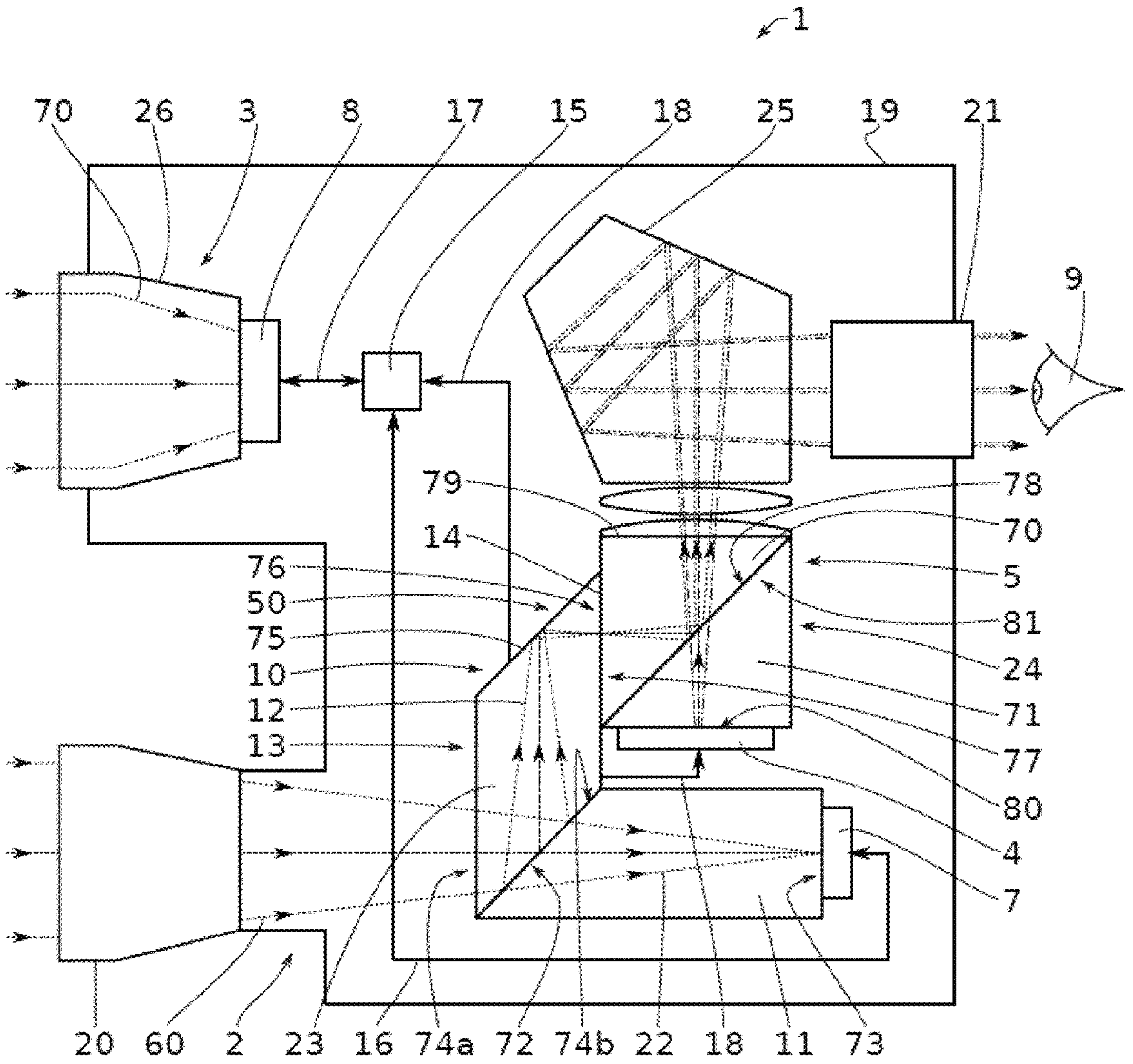
FIG. 1 diagrammatically shows an embodiment of an observation system according to the invention.

The drawings are provided by way of example and are not intended to limit the scope of the invention. They constitute diagrammatic views intended to ease the understanding of the invention and are not necessarily to the scale of practical applications.

DETAILED DESCRIPTION

FIGS. 1 to 5 show an observation system 1 for observing a scene. Generally speaking, the system 1 comprises a first optical path 2, a second optical path 3, a display 4 and a third optical path 5 coupled to the display 4. Advantageously, the observation system 1 is portable, i.e. it can be carried by hand by a user. Moreover, the first optical path 2 is capable of receiving first optical radiation 60 emitted by the scene to be observed, the latter not being represented in the FIGS. for simplification purposes. Optical radiation is understood to mean electromagnetic radiation in the ultraviolet, visible and infrared ranges. The scene to be observed can be located outside, as well as inside a building, and the system 1 is particularly suitable for observing the scene both during the day and at night. The first optical path 2 includes a first sensor 7 configured to generate a first digital image from the first optical radiation 60. The first sensor 7 is an electronic device and is powered by a battery, not shown in the figures for simplification purposes. The second optical path 3 is capable of receiving second optical radiation 70 emitted by the scene and includes a second sensor 8 configured to generate a second digital image from the second optical radiation 70. The first and second optical paths 2, 3 are also considered to be digital observation paths as they each include a digital sensor 7, 8 configured to generate a digital image. The first and second optical paths 2, 3 are also referred to as the first and second digital paths. The second sensor 8 is also powered by the battery. The display 4 is configured to display a third digital image from the first and second digital images respectively originating from the first and second sensors 7, 8. The display 4 is powered by the battery. For example, the first optical path 2 can be a daytime digital observation path, i.e. the first sensor 7 is sensitive to light visible to an eye of the user 9. Advantageously, the second optical path 3 can be a night-time digital observation path, i.e. the second sensor 8 is sensitive to infrared, in particular to infrared light with a wavelength greater than or equal to 700 nm. According to another embodiment, the first sensor 7 is sensitive to infrared light, for example to light with a wavelength greater than 700 nm. In other respects, the third optical path 5 is designed to observe the third digital image originating from the display 4. Generally speaking, an optical path is understood to mean a channel in which optical radiation propagates.

In particular, the system 1 includes a fourth optical path 10 connecting the first and third optical paths 2, 5. The first optical path 2 further includes an optical element 11 configured to transmit a part 12 of the first optical radiation 60 to the fourth optical path 10. For example, the optical element 11 transmits the part 12 of the first optical radiation 60 to the fourth optical path 10, whereas another part 22 of the first optical radiation 60 is directed towards the first sensor 7. An optical element 11 is understood to mean an element that allows the trajectory of optical radiation or the properties of the optical radiation to be changed, such as a mirror, a lens, a diffraction grating, or a prism, etc. Preferably, the optical element 11 is a beam splitter, for example a semi-reflective mirror, i.e. an optical element that allows part of the light to be transmitted and the rest to be reflected. In other words, when the optical element 11 is a beam splitter, it allows the part 12 of the first optical radiation 60 to be transmitted to the fourth optical path 10, and the other part 22 of the first optical radiation 60 to be transmitted to the first sensor 7. The optical element 11 can be a prism having a semi-reflective entrance face 72. A prism is understood to mean a block of cut glass comprising at least five surfaces, or faces. The fourth optical path 10 allows the user to observe the scene directly. It is also referred to as the direct optical path. In other words, the fourth optical path 10 does not include an electronic device configured to transform photons into electrons, such as an amplification device, nor an electronic sensor transforming light radiation into a digital image.

Advantageously, the system 1 includes an optical assembly 13 comprising at least the optical element 11. The optical assembly 13 can further comprise other optical elements. These other optical elements are referred to as optical systems 23, 24, 111. The optical element 11 and the optical systems 23, 24, 111 can be prisms and the optical assembly 13 is thus a prismatic assembly, i.e. an assembly of prisms. The optical assembly 13 is a particularly simple and rigid structure and simplifies the observation system 1 while reducing the weight thereof.

FIG. 1 shows an embodiment of the optical assembly 13. The optical assembly 13 includes the optical element 11, a first optical system 23 coupled to the optical element 11, and a second optical system 24 coupled to the first optical system 23. Generally speaking, two optical elements coupled to one another is understood to mean that two optical elements are in contact with one another. They can be mounted in a fixed or removable manner, on top of one another. In this embodiment, the optical element 11 and the first optical system 23 are respectively two prisms and the second optical system 24 includes two prisms 70, 71.

The optical element 11 includes the entrance face 72 and an exit face 73. The exit face 73 is a neutral face coupled to the first sensor 7. A neutral face is understood to mean a transparent face that allows optical radiation to pass therethrough. The entrance face 72 is a semi-reflective mirror for transmitting a first part 12 of the first radiation 60 to the fourth optical path 10 and a second part 22 of the first radiation 60 to the first sensor 7, via the exit face 73. In this embodiment, the first part 12 of the first optical radiation 60 is transmitted, by reflection, to the fourth optical path 10. The first optical system 23 is configured to transmit the first part 12 of the first optical radiation 60 from the fourth optical path 10 to the third optical path 5. The first optical system 23 includes a first neutral entrance face 74*a* for receiving the first radiation 60, and a second neutral entrance face 74*b* coupled to the entrance face 72 of the optical element 11 for receiving the first part 12 of the radiation. Furthermore, the first optical system 23 includes a neutral exit face 76 and an intermediate face 75 reflecting the first part 12 of radiation to transmit it to the third optical path 5, via the exit face 76. The role of the second optical system 24 is to carry out optical fusion, i.e. to superimpose optical rays, between the third digital image displayed and the first part 12 of the first optical radiation 60 originating from the scene to be observed. In other words, the second optical system 24 is configured to transmit the first part 12 of the first optical radiation 60 to an eyepiece 21 and to transmit the third digital image originating from the display 4 to the eyepiece 21. The second optical system 24 is a beam splitter. It includes a first prism 70 having a neutral entrance face 77 coupled to the exit face 76 of the first optical system 23, and a semi-reflective intermediate face 78 for transmitting part of the first part 12 of radiation to a neutral exit face 79 corresponding to an exit face of the optical assembly 13. This exit face 79 transmits the radiation originating from the scene to be observed and from the third digital image to the eyepiece 21, so that the scene and the third digital image can be observed. Moreover, the second optical system 24 includes a second prism 71 having a neutral entrance face 80 coupled to the display 4 and a neutral exit face 81 coupled to the intermediate face 78 of the first prism 70. Thus, the second prism 71 allows the third digital image to be transmitted to the exit face 79 of the optical assembly 13. The third optical path 5 comprises the second optical system 24 and allows the scene to be observed based on the first optical radiation 60 and on the third digital image displayed by the display 4.

Advantageously, the prisms 11, 23, 70, 71, 111 of the optical assembly 13 can be bonded together to form a one-piece optical assembly 13. According to yet another advantage, further elements 4, 7, 14, 90, 107 can be fixedly mounted on the optical assembly 13. Moreover, when elements 4, 7, 14, 90, 107 are fixedly mounted on a one-piece optical assembly 13, the one-piece optical assembly 13 and the fixed elements 4, 7, 14, 90, 107 form a one-piece assembly 50. The term 'one-piece' is understood to mean an assembly of elements that are fixed to one another in such a way that the removal of one of the elements from the assembly leads to the mechanical destruction of the assembly.

Thus, a one-piece assembly 50 is provided, preventing movement of the elements of the assembly 50 relative to one another, which can occur, for example, in the event of impacts or vibrations. The one-piece assembly 50 is also said to act as an optical invariant. Advantageously, the first sensor 7 and the display 4 are fixedly mounted on the one-piece optical assembly 13. This makes a collimation of the first, third and fourth optical paths 2, 5, 10 robust to any displacements of the various elements of the optical paths relative to one another, in particular displacements relative to a lens 20 located at the entrance of the first optical path 2 or relative to the eyepiece 21 located at the exit of the third optical path 5. The second optical path 3 can be collimated by digital image processing with the first digital path 2 using conventional image processing techniques. Thus, after digital collimation of the first and second digital paths 2, 3, the one-piece assembly 50 allows the first and second digital paths 2, 3 to be collimated with the third and fourth optical paths 5, 10. The one-piece assembly 50 allows the third digital image, originating from the first and second digital images, to be superimposed with the image of the scene originating from the fourth optical path 10, i.e. the part 12 of the first optical radiation 60, without any offset between the fields. The one-piece assembly 50 provides for robust collimation by maintaining collimation in the event of any impacts and vibrations. In other words, the one-piece assembly 50 minimises the risk of decollimation.

Advantageously, the optical assembly 13 can include a crosshair reticle 14. More particularly, the fourth optical path 10 includes the crosshair reticle 14. For example, the reticle 14 is a FIG. deposited on a surface of a glass by screen printing or photolithography. The reticle 14 can also be made of tensioned wires. A figure can thus be superimposed on the image of the scene to be observed. The crosshair reticle 14 can be mounted on the optical assembly 13, preferably in a fixed manner, to thus form part of the one-piece assembly 50. This makes the collimation of the first, third and fourth optical paths 2, 5, 10 with the crosshair reticle 14 robust to any displacements of the various elements of these optical paths 2, 5, 10 relative to one another. Advantageously, the crosshair reticle 14 is fixedly mounted on the exit face 76 of the first optical system 23.

The system 1 can further comprise an image processing unit 15, for example a microprocessor, configured to generate the third digital image based on the first and second digital images. For example, the third image is generated based on a digital fusion of the first and second digital images. The unit 15 is coupled to the first sensor 7 via a connection 16, and to the second sensor 8 via a connection

17. Moreover, the unit 15 is coupled to the display 4 via a connection 18 in order to transmit the third digital image to the display 4.

Advantageously, the observation system 1 includes a casing 19 in which the sensors 7, 8, the optical element 11, the display 4, the optical assembly 13, the reticle 14 and the battery are housed. Furthermore, the first optical path 2 can comprise the lens 20 mounted on the casing 19. The second optical path 3 can further comprise an additional lens 26 mounted on the casing 19. The eyepiece 21 allows the user 9 to observe the third image from the display 4 and the first part 12 of the first optical radiation 60. Advantageously, in the event of movement of the lens 20 relative to the one-piece assembly 50, the first, third and fourth optical paths 2, 5 and 10 and the reticle 14 remain collimated with one another.

Figure 2:
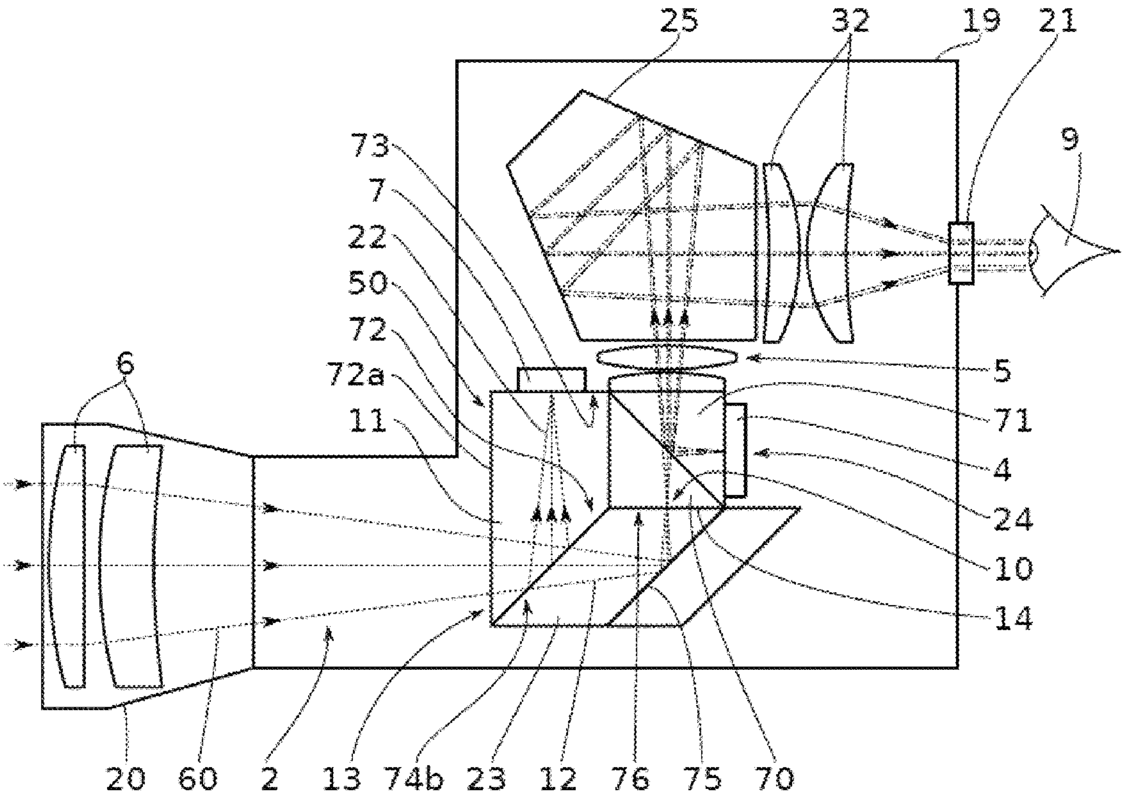
FIG. 2 diagrammatically shows another embodiment of the observation system.
Figure 4:
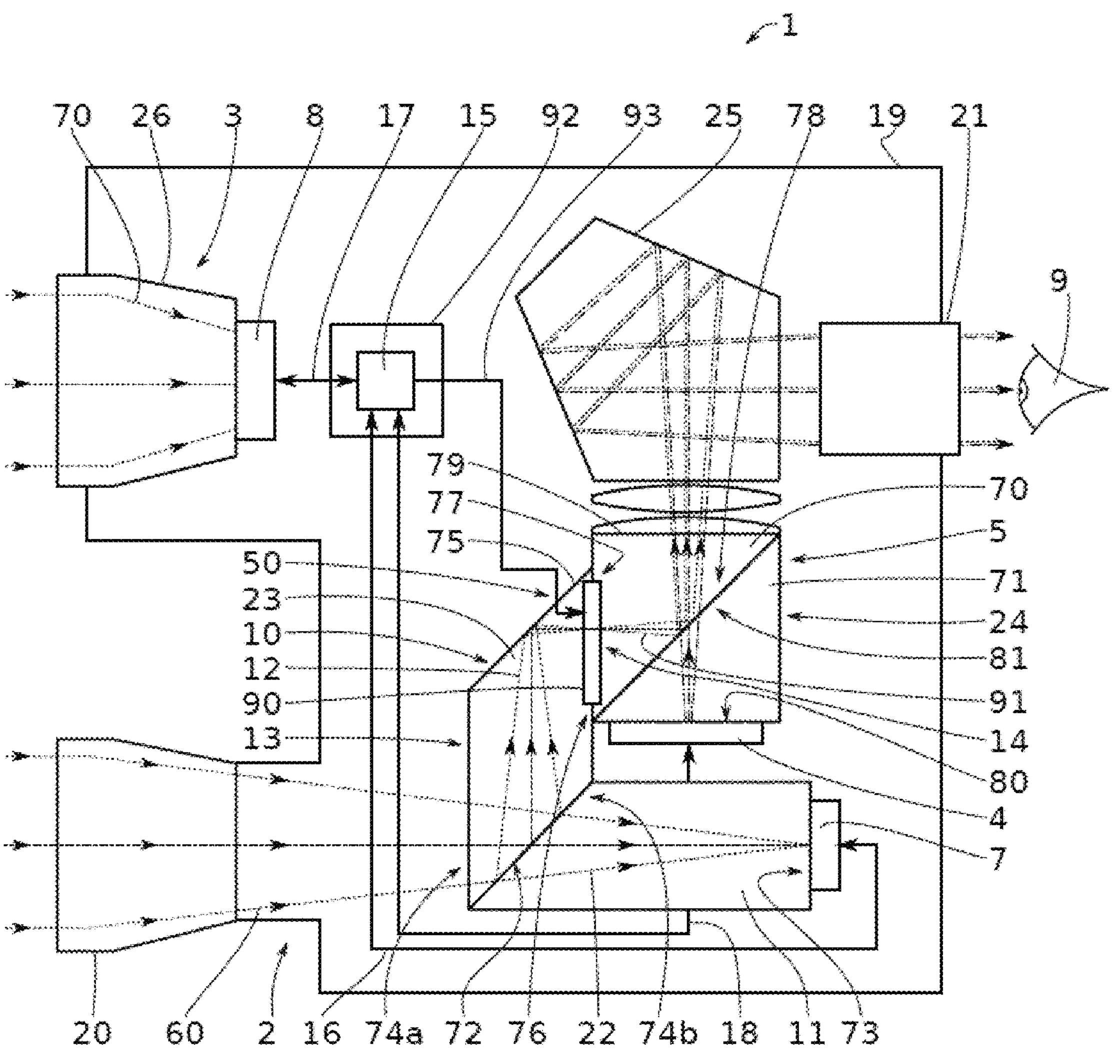
FIG. 4 diagrammatically shows another embodiment of an observation system.

Advantageously, the third optical path 5 comprises an image rectifying prism 25 placed between the second optical system 24 and the eyepiece 21, as shown in FIGS. 1, 2 and 4. The rectifying prism 25 has seven faces, two of which are parallel to one another and are not shown in FIGS. 1, 2 and 4, three reflective faces, a transparent entrance face and a transparent exit face. Preferably, the eyepiece 21 and the rectifying prism 25 are not fixedly mounted on the optical assembly 13. Thus, relative movements of the eyepiece 21 or of the rectifying prism 25 do not entail relative variations between the fields.

FIG. 2 shows another embodiment wherein the optical element 11 is also a beam splitter for transmitting the part 12 of the first optical radiation 60 to the fourth optical path 10, and for transmitting the other part 22 of the first optical radiation 60 to the first sensor 7. FIG. 2 also shows the four prisms defined hereinabove, but disposed differently. In particular, the optical element 11 includes an additional neutral entrance face 72*a* for transmitting the first optical radiation 60 to the semi-reflective entrance face 72.

Advantageously, the lens 20 of the first optical path 2 can comprise an optical device 6, for example one or more focusing lenses, configured to transmit the first optical radiation 60 to the optical element 11. In particular, the optical device 6 allows the focus of the first optical radiation 60 to be changed. The system 1 can further comprise additional focusing lenses 32 placed between the rectifying prism 25 and the eyepiece 21, as shown in FIG. 2. The second optical path is not shown in FIG. 2 for simplification purposes. In the embodiment shown in FIG. 2, the first part 12 of the first optical radiation 60 is transmitted, by transparency, to the first optical system 23.

Figure 3:
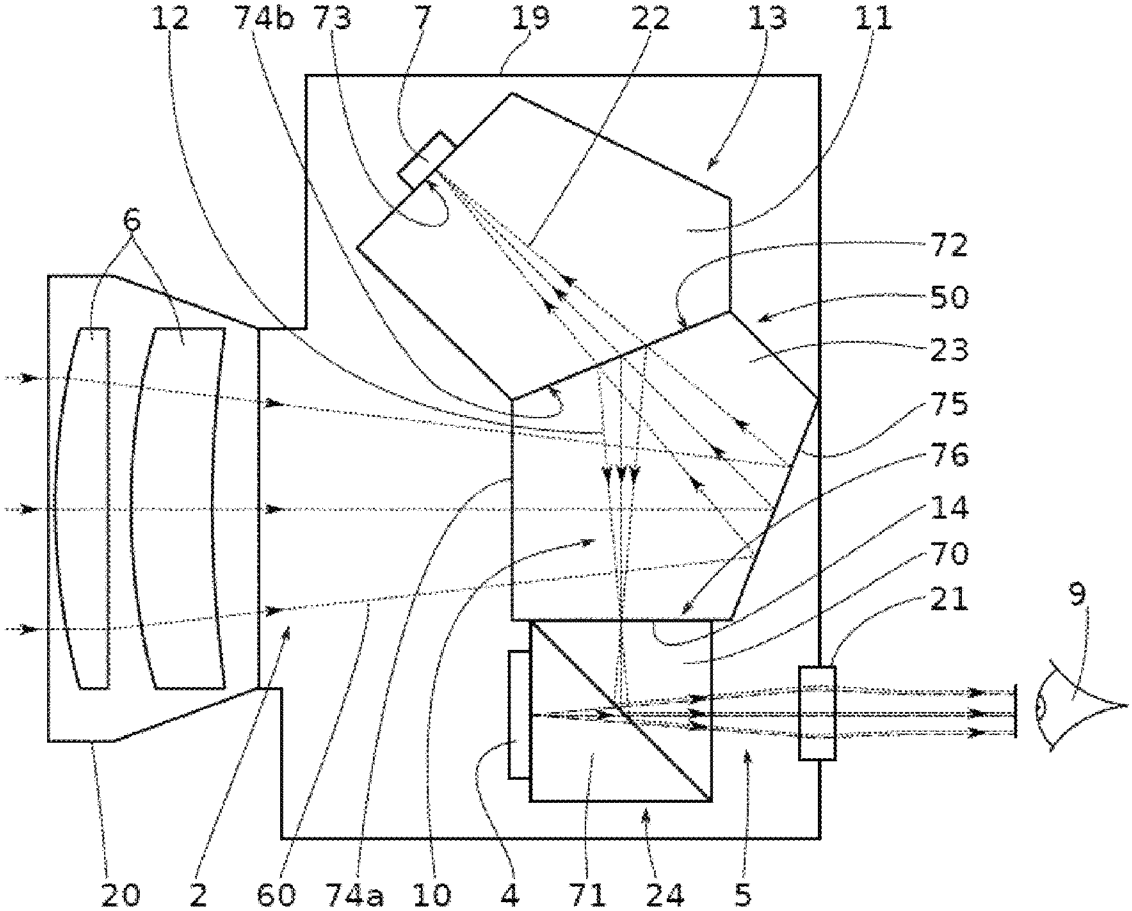
FIG. 3 diagrammatically shows another embodiment of an observation system.

FIG. 3 shows a further embodiment, wherein the optical assembly 13 includes the four prisms defined hereinabove, but disposed differently. In this other embodiment, the first optical system 23 is further configured to transmit the first optical radiation 60 to the optical element 11. In particular, the first optical system 23 is placed such that the intermediate reflective face 75 thereof reflects the first optical radiation 60 towards the entrance face 72 of the optical element 11. This optical assembly 13 allows the length of the first optical path 2 to be significantly reduced, and allows the overall dimensions of the observation system 1 to be reduced.

The second optical path is not shown in FIG. 3 for simplification purposes.

FIG. 4 shows a further embodiment of the observation system, wherein the fourth optical path 10 further includes an optical attenuator 90 having variable opacity. That is to say that the optical attenuator 90 is capable of changing a light intensity of the first part 12 of the first optical radiation 60. In particular, the optical attenuator 90 receives the first part 12 of the first optical radiation 60 and transmits third optical radiation 91 to the third optical path 5. The third optical path 5 can thus be used to observe the third optical radiation 91 superimposed on the third digital image displayed by the display 4. More particularly, the second optical system 24 receives the third optical radiation 91 and allows the third digital image to be optically fused with the third optical radiation 91 transmitted by the attenuator 90. In other words, the second optical system 24 is configured to transmit the third optical radiation 91 to the eyepiece 21 and to transmit the third digital image originating from the display 4 to the eyepiece 21. The attenuator 90 can be fixedly mounted on the exit face 76 of the first optical system 23, and transmit the third optical radiation 91 by transparency. Alternatively, the attenuator 90 can be fixedly mounted on the intermediate face 75 of the first optical system 23, and transmit the third optical radiation 91 by reflection. Advantageously, the optical attenuator 90 is fixedly mounted on the one-piece optical assembly 13.

The system 1 further includes an electronic control unit 92, for example a microprocessor, comprising the image processing unit 15. The image processing unit 15 is further configured to determine a light intensity of at least one pixel of at least one digital image from among the first and second digital images. The image processing unit 15 can be a specific microprocessor integrated into the electronic control unit 92 and capable of performing calculations on the first and second digital images originating from the first and second sensors 7, 8 respectively, and on the third digital image generated. For example, the image processing unit 15 is capable of carrying out the image processing algorithm steps. The electronic control unit 92 is coupled to the optical attenuator 90 via a connection 93. The electronic control unit 92 is further configured to output a command to vary the opacity of the optical attenuator 90. For example, the optical attenuator 90 includes one or more liquid crystal cells. The optical attenuator 90 receives an electric current, via the connection 93, output by the electronic control unit 92. The opacity of the attenuator 90 varies according to the value of the electric current received. More particularly, the electronic control unit 92 changes the opacity of the attenuator 90 based on the light intensity determined by the image processing unit 15.

Preferably, the first sensor 7 is sensitive to optical radiation having a wavelength in the visible range, for day vision, and the second sensor 8 is sensitive to optical radiation having a wavelength in the infrared range, for night vision. In such a case, the electronic control unit 92 is configured to output a command to increase the opacity of the attenuator 90 when the light intensity of at least one pixel of the first determined digital image is greater than or equal to a first threshold. Glare, for example from the sun, can thus be avoided in day vision. Furthermore, the electronic control unit 92 is configured to output a command to increase the opacity of the attenuator 90 when the light intensity of at least one pixel of the second digital image is greater than or equal to a second threshold. Local glare, for example from a light fixture in an urban zone, can thus be avoided in night vision. An observation system 1 is thus provided that improves the observation of a scene. In particular, an automated system is provided that takes into account the light intensity of the optical radiation emitted by the scene to improve observation.

The image processing unit 15 is further configured to determine the light intensities of each of the pixels of the first and second digital images. Moreover, the electronic control unit 92 outputs a command to decrease the opacity of the attenuator when the light intensities of the pixels of the first and second digital images are below the first and second thresholds. When the battery no longer powers the observation system 1, the attenuator 90 has a default opacity value that corresponds to maximum transmission or reflection. Preferably, the opacity of the attenuator 90 can be zero in the absence of power. This allows observation through the fourth optical path 10 to be guaranteed in the absence of a power source.

Furthermore, the electronic control unit 92 can be configured to output a command to vary the opacity of the attenuator 90 according to a continuous function following a piecewise continuous, linear or analogue control law, for example a logarithmic function. According to an alternative embodiment, the electronic control unit 92 can be configured to output a command to vary the opacity of the attenuator 90 according to a discrete function following a numerical control law, i.e. with a plurality of stages or levels of opacity, preferably with at least three stages, for example with 128, 256 or 512 stages. Generally speaking, the electronic control unit 92 transmits a command, for example in the form of a voltage in volts, to the attenuator 90. The volt command thus transmitted can follow a continuous or discrete function as defined hereinabove.

Figure 5:
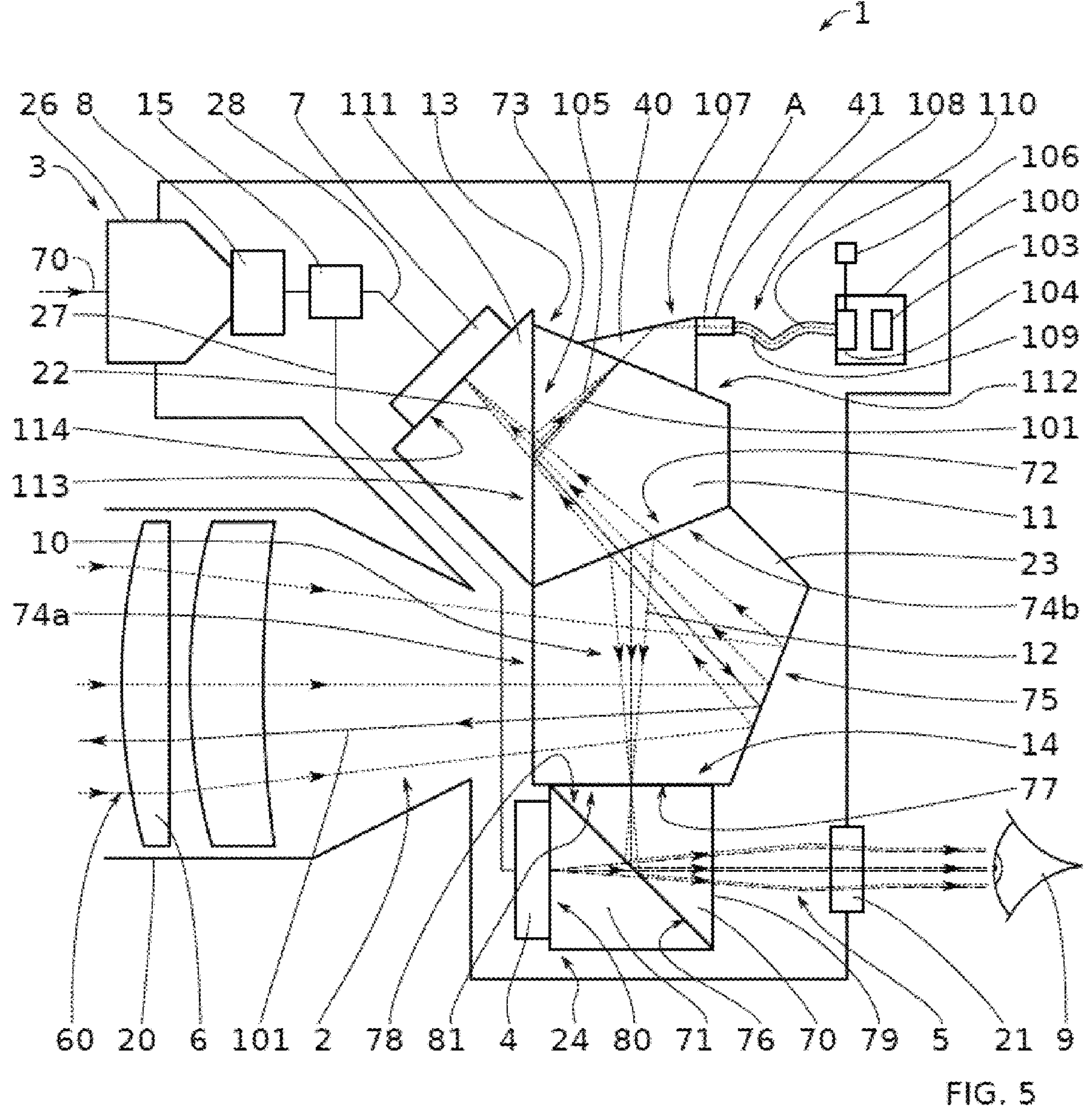
FIG. 5 diagrammatically shows yet another embodiment of an observation system.

FIG. 5 shows a further embodiment of the observation system 1. In this further embodiment, the observation system 1 comprises an emitter 100 configured to emit fourth optical radiation 101 in the infrared range, i.e. with a wavelength of greater than or equal to 700 nanometres. Preferably, the fourth optical radiation 101 has a wavelength in the near-infrared range, i.e. a wavelength of between 700 and 2,000 nanometres. Furthermore, in this embodiment, the optical element 11 is configured to transmit the fourth optical radiation 101 to the scene to be observed. In particular, the fourth optical radiation 101 is emitted from the first optical path 2, which reduces the overall dimensions of the observation system 1. Moreover, when the first optical path 2 of the system 1 includes an optical device 6, the optical element 11 transmits the fourth optical radiation 101 to the optical device 6. Thus, the scene to be observed can be illuminated with visible light from an apparatus fitted with a sensor of the infrared type. More particularly, the optical element 11 is transparent to infrared-type optical radiation while being semi-transparent to optical radiation in the visible range, i.e. to optical radiation with wavelengths between 380 nanometres and 750 nanometres. In other words, the optical element 11 is configured to allow the second part 22 of the first optical radiation 60 to pass to the main sensor 7, to reflect the first part 12 of the first optical radiation 60 towards the fourth optical path 10, and to transmit the fourth optical radiation 101 to the optical device 6.

Generally speaking, the optical device 6 is transparent to optical radiation in the visible and infrared range.

The emitter 100 can include an amplifier 103 configured to emit the fourth laser-type optical radiation 101. The scene is thus illuminated by a laser spot.

Furthermore, the emitter 100 is configured to emit fourth optical radiation 101 of the pulsed type with a wavelength in the infrared range. The system 1 further includes a receiver 104 configured to receive a part 105 of the fourth pulsed optical radiation 101 returned by the scene to be observed. The system 1 further comprises an electronic control unit 106, for example a microprocessor, configured to determine a distance to the scene to be observed based on the returned part 105 of the pulsed optical radiation 101. In other words, the distance is determined by emitting a series of short-duration laser pulses to the scene to be observed, then collecting the energy backscattered by the illuminated scene. The measurement of the time of flight then allows the distance travelled by the fourth optical radiation 101 to be deduced, and thus the distance between the scene and the observation system 1 to be deduced.

The battery is used to power the emitter 100, the amplifier 103, the receiver 104 and the electronic control unit 106.

Advantageously, the observation system 1 comprises an optical connector 107 and an optical fibre 108. The optical fibre 108 includes a first part 109 connecting the optical connector 107 to the emitter 100, and a second part 110 connecting the optical connector 107 to the receiver 104. Preferably, the first part 109 corresponds to a central part of the optical fibre 108, and the second part 110 corresponds to a cladding that surrounds the central part 109. The first and second parts 109, 110 of the optical fibre 108 are configured to allow optical radiation to propagate, in particular optical radiation in the infrared range.

The optical connector 107 is configured to transmit the fourth optical radiation 101. For example, the optical connector 107 includes an optical prism 40, preferably a total reflecting prism, and a ferrule 41 connecting the optical fibre 108 to the optical prism 40. Thus, the fourth optical radiation 101 emitted by the emitter 100 propagates in the first part 109 of the optical fibre 108, and the second part 110 of the optical fibre 108 allows the returned part 105 of the pulsed optical radiation 101 to be received.

The optical prism 40 can be bonded to the ferrule 41. Preferably, a space free of adhesive, for example a layer of air or a vacuum, is created between the ferrule 41 and the optical prism 40 so as to prevent a laser emission of the fourth optical radiation 101 from passing through a layer of adhesive.

The optical fibre 108 can thus be used to determine the distance to the scene to be observed. In particular, use of the optical fibre 108 allows the receipt and emission of the fourth optical radiation 101 to be juxtaposed in order to determine the distance, thereby reducing the overall dimensions of the observation system 1.

Furthermore, when looking to illuminate the scene to be observed, using laser-type radiation, the emitter 100 amplifies the fourth optical radiation 101, by means of the amplifier 103, which propagates in the first part 109 of the optical fibre 108 towards the optical connector 107.

The optical connector 107 thus provides a single optical interface for emitting the fourth pulsed-type optical radiation 101, for receiving the returned part 105 of the pulsed optical radiation for distance determination, and for emitting the fourth laser-type optical radiation 101 in order to illuminate the scene to be observed.

The optical element 11 is further configured to transmit the part 105 of the fourth optical radiation 101 returned by the scene to the optical connector 107. In particular, the entrance face 72 thereof is transparent to optical radiation of the infrared type, and is semi-reflective, or semi-transparent, for optical radiation in the visible range. The exit face 73 thereof is a face that is transparent to optical radiation with a wavelength in the visible range, and reflective to optical radiation with a wavelength in the infrared range. The exit face 73 allows the second part 22 of the first radiation 60 to be transmitted to the main sensor 7, and the fourth optical radiation 101 to be reflected towards the entrance face 72 thereof on the one hand, and the returned part 105 of the fourth optical radiation 101 to be reflected towards the optical connector 107 on the other hand. The optical element

11 further includes an additional neutral exit face 112 coupled to the optical prism 40 of the optical connector 107, for allowing infrared-type optical radiation propagating between the optical connector 107 and the optical device 6 to pass therethrough. The system 1 further includes a third optical system 111, preferably a prism, coupled to the first sensor 7 and to the optical element 11. The third optical system 111 allows the second part 22 of the first optical radiation 60 to be transmitted to the first sensor 7. The third optical system 111 has a neutral entrance face 113 coupled to the exit face 73 of the optical element 11 and a neutral exit face 114 coupled to the main sensor 7.

In this embodiment, the first optical system 23 is similar to the first optical system 23 of the embodiment shown in FIG. 3. In this embodiment, the first entrance face 74*a* thereof is neutral so as to receive the first optical radiation 60 and to allow the optical radiation 101, 105 with a wavelength in the infrared range to pass therethrough. The second entrance face 74*b* thereof is also neutral to optical radiation in the visible and infrared range. Moreover, the intermediate face 75 thereof is reflective to the optical radiation 101, 105, 60.

Advantageously, the third optical system 111 and the optical prism 40 of the optical connector 107 are fixedly mounted on the one-piece optical assembly 13 and form part of the one-piece assembly 50.

An observation method can be implemented by the observation system 1 defined hereinabove. The method comprises the following main steps: receiving the first optical radiation emitted by the scene to be observed from the first optical path 2 provided with the first sensor 7, which generates the first digital image based on the first optical radiation 60; then, receiving the second optical radiation 70 emitted by the scene from the second optical path 3 provided with the second sensor 8, which generates the second digital image based on the second optical radiation 70. Moreover, the method comprises observing a third digital image from the third optical path 5 provided with the display 4 displaying the third digital image based on the first and second digital images. In particular, the method includes transmitting a part 12 of the first optical radiation 60 to the third optical path 5.

Furthermore, a method for manufacturing the observation system 1, comprising an emitter 100 for illuminating a scene and calculating a distance between the scene and the observation device 1, is described hereinbelow. The manufacturing method comprises providing the first, second, third and fourth optical paths 2, 3, 5, 10 and providing the emitter 100. Moreover, the method includes mounting an optical assembly 13 including at least the optical element 11.

Advantageously, the method comprises mounting the first sensor 7 in a fixed manner on the optical assembly 13.

According to another advantage, the method comprises mounting the crosshair reticle 14 on the optical assembly 13. According to an alternative embodiment, the display 4 can be configured to display a crosshair reticle in the third optical path 5. For example, the crosshair reticle can be a cross, a circle or more generally a figure. The displayed crosshair reticle in particular allows the location of the fourth optical radiation 101 to be identified in the scene. Thus, when the display 4 is fixedly mounted on the optical assembly 13, for example on the entrance face 80 of the second optical system 24, the first, third and fourth optical paths 2, 5, 10 are collimated with the crosshair reticle displayed.

The method can further comprise mounting the optical fibre 108 on the optical connector 107. The method then comprises mounting the optical connector 107 on the optical assembly 13. Such a method makes it possible both to optimise a coupling of the part 105 of the fourth optical radiation 101 returned by the scene with the second part 110 of the optical fibre 108, i.e. the fibre for receiving the part 105 of radiation returned by the scene, and to centre, relative to the crosshair reticle 14, the point of the scene targeted by the fourth optical radiation 101.

Advantageously, after mounting the ferrule 41 on the optical prism 40 of the optical connector 107, the step of mounting the optical connector 107 includes adjusting a position of the optical connector 107 along an axis parallel to a longitudinal axis A of the ferrule 41. This adjustment optimises the emission and receipt of the pulsed optical radiation to determine the distance to the scene. During this adjustment, the position of the centre of a point formed by the fourth optical radiation 101 in the scene does not change, but the diameter of the point is modified. Unlike conventional methods, the aim is not to place the optical connector 107 in a position where the diameter of the point is as small as possible. More specifically, if the optical connector 107 is placed in this position, the divergence of the emission of the fourth optical radiation 101 is at its lowest and the return photons propagate essentially within the first part 109 of the optical fibre 108. These photons are thus lost with respect to the distance measurement, the coupling between emission and receipt decreases, and the measurement is less accurate. The optical connector 107 is thus positioned so as to increase the divergence of the emission of the fourth optical radiation 101 in order to increase the diameter of the point and to increase the number of return photons within the second part 110 of the optical fibre 108. The coupling between emission and receipt is thus improved in order to improve the accuracy of the distance measurement.

The step of mounting the optical connector 107 can include adjusting a position of the optical connector 107 along an axis perpendicular to the longitudinal axis A of the ferrule 41. This adjustment allows the position of the point formed by the fourth optical radiation 101 on the scene to be collimated with the crosshair reticle 14, i.e. it allows the point to be brought as close as possible to the scene targeted by the user. The adjustment is made in such a way as to minimise the relative offset between the position of the point and the position of the crosshair reticle 14. To make this adjustment, the crosshair reticle 14 is illuminated by the lower part of the optical assembly 13. The fourth optical radiation 101 is emitted at the same time. Using a telescope to look at the beams exiting the optical device 6 towards the telescope at infinity, the crosshair reticle 14 and the relative position of the point can be viewed at the same time. The position of the optical connector 107 is thus chosen so as to reduce the offset, as viewed by the telescope, between the point and the crosshair reticle 14. The two aforementioned adjustments can be made sequentially, one after the other. By making adjustments along two axes perpendicular to one another, one adjustment has little influence on the other.

The method can comprise, after at least one of the adjustment steps, attaching the optical connector 107 to the optical assembly 13.

The system and method described hereinabove are particularly suitable for portable monocular or binocular-type systems and for both day and night vision. The observation system reduces the size of the batteries and is particularly light. Moreover, it prevents offsets between the image fields in the event of impacts and vibrations, and makes it easier to observe scenes when the user is moving. The observation system improves the observation of a scene both during the day and at night. Such an observation system allows the scenes to be observed to be illuminated and distances between the scenes and the observation system to be calculated, while being compact.

The invention claimed is:

1. An observation system comprising a first optical path capable of receiving a first optical radiation emitted by a scene to be observed and including a first sensor configured to generate a first digital image from the first optical radiation; a second optical path capable of receiving a second optical radiation emitted by the scene and including a second sensor configured to generate a second digital image from the second optical radiation; a display configured to display a third digital image from the first and second digital images; and a third optical path coupled to the display and designed to observe the third digital image; wherein it includes a fourth optical path connecting the first and third optical paths, and in that the first optical path includes an optical element configured to transmit a part of the first optical radiation to the fourth optical path.

2. The system according to claim 1, comprising an optical assembly including the optical element and an optical system configured to transmit the part of the first optical radiation from the fourth optical path to the third optical path.

3. The system according to claim 2, wherein the optical assembly is a one-piece assembly.

4. The system according to claim 2, wherein the first sensor and the display are fixedly mounted on the optical assembly.

5. The system according to claim 2, wherein the fourth optical path comprises a crosshair reticle fixedly mounted on the optical assembly.

6. The system according to claim 1, comprising an optical assembly including the optical element and an optical system configured to transmit the first optical radiation to the optical element.

7. The system according to claim 6, wherein the optical assembly is a one-piece assembly.

8. The system according to claim 1, comprising an image processing unit configured to generate the third digital image from a fusion of the first and second digital images.

9. The system according to claim 8, wherein the fourth optical path includes an optical attenuator having a variable opacity and capable of modifying a light intensity of the part of the first optical radiation, the image processing unit is further configured to determine a light intensity of at least one pixel of at least one of the first and second digital images, the system comprising an electronic control unit configured to output a command to vary the opacity of the optical attenuator based on the determined light intensity.

10. The system according to claim 9, wherein the electronic control unit is configured to output a command to increase the opacity of the optical attenuator when the light intensity of said at least one pixel is greater than or equal to a threshold.

11. The system according to claim 1, wherein the optical element is further configured to transmit a further part of the first optical radiation to the first sensor.

12. The system according to claim 1, comprising an emitter configured to emit a third optical radiation in an infrared range, the optical element being further configured to transmit the third optical radiation to the scene to be observed.

13. The system according to claim 12, wherein the third optical radiation is of a pulsed type, the system further comprising a receiver configured to receive a part of the third pulsed optical radiation returned by the scene to be observed and an electronic control unit configured to determine a distance from the system to the scene to be observed based on the returned part of the third pulsed optical radiation.

14. An observation method, comprising receiving a first optical radiation emitted by a scene to be observed from a first optical path provided with a first sensor generating a first digital image from the first optical radiation; receiving a second optical radiation emitted by the scene from a second optical path provided with a second sensor generating a second digital image from the second optical radiation; and observing a third digital image from a third optical path provided with a display displaying the third digital image from the first and second digital images; wherein it includes transmitting a part of the first optical radiation to the third optical path.

15. The method according to claim 14, including an optical attenuator having a variable opacity and capable of modifying a light intensity of the part of the first optical radiation, and determining a light intensity of at least one pixel of at least one of the first and second digital images, and varying the opacity of the optical attenuator based on the determined light intensity.

16. The method according to claim 14, comprising emitting a third optical radiation in an infrared range and transmitting, from the first optical path, the third optical radiation to the scene to be observed.

* * * * *